(No Model.) 3 Sheets—Sheet 3.
F. O. HOLMSTROM.
SPIRAL TURNING MACHINE.
No. 507,619. Patented Oct. 31, 1893.
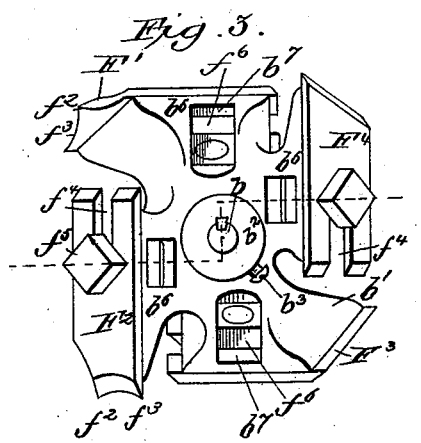
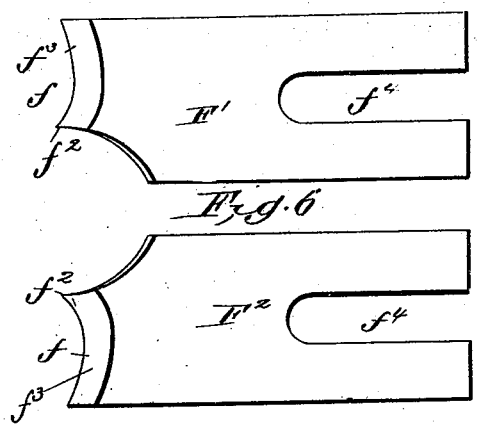
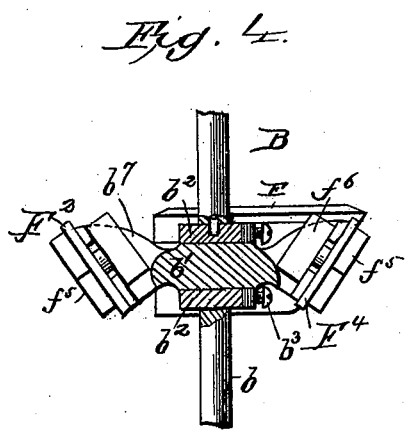
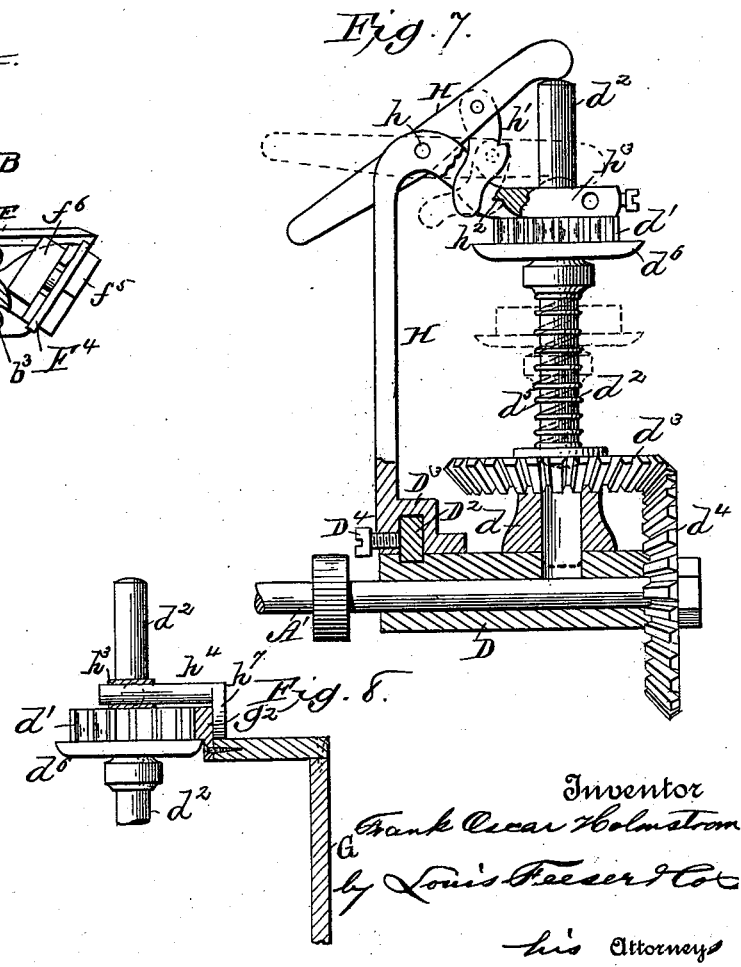
Witnesses
A. J. Schwartz
R. E. Auld.
Inventor
Frank Oscar Holmstrom
by Louis Feeser & Co.
his Attorneys

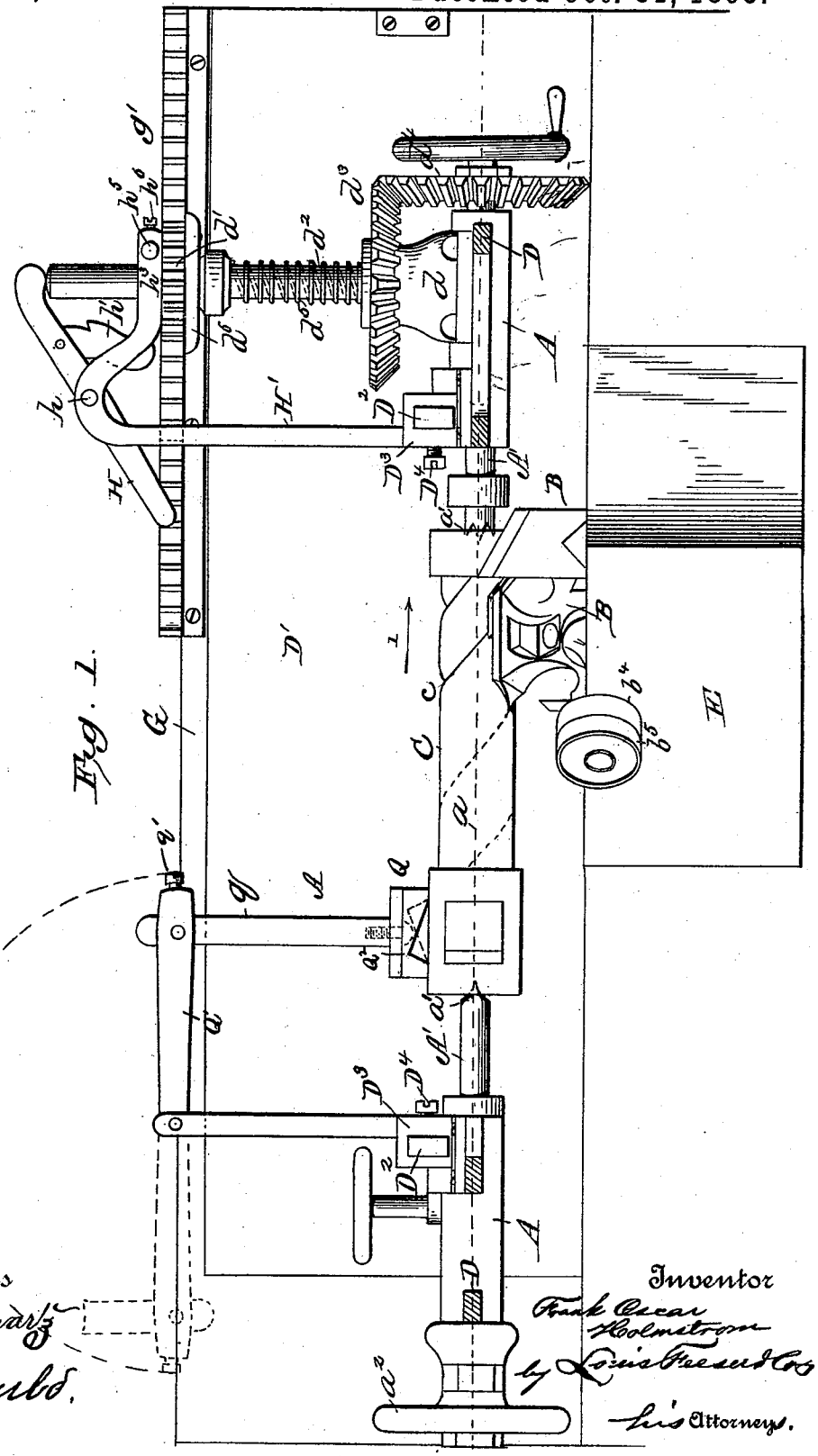

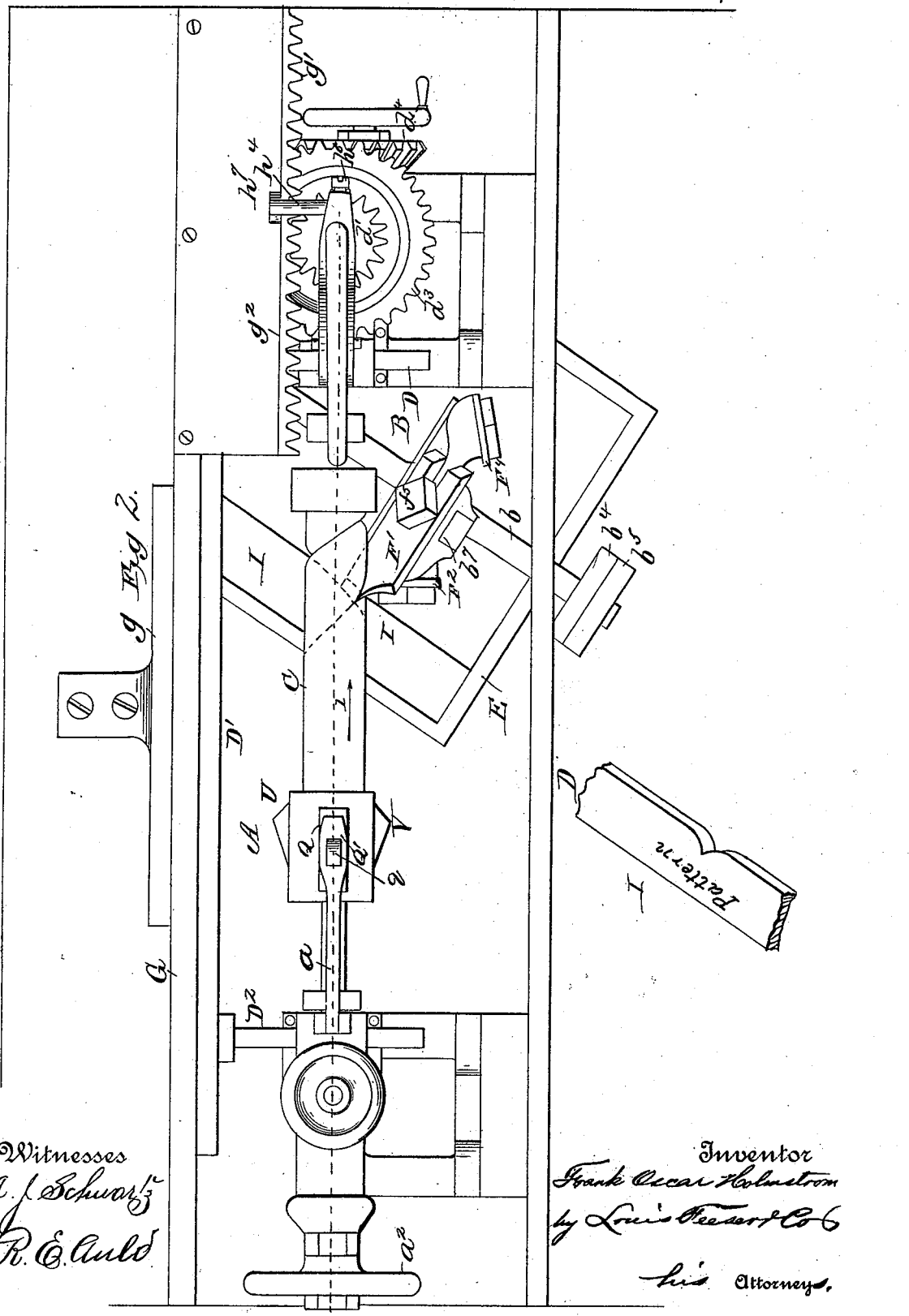

United States Patent Office.

FRANK OSCAR HOLMSTROM, OF ST. PAUL, MINNESOTA.

SPIRAL TURNING MACHINE.

SPECIFICATION forming part of Letters Patent No. 507,619, dated October 31, 1893.

Application filed June 14, 1892. Serial No. 436,652. (No model.)

*To all whom it may concern:*

Be it known that I, FRANK OSCAR HOLMSTROM, a citizen of the United States, residing at St. Paul, in the county of Ramsey and State of Minnesota, have invented certain new and useful Improvements in Spiral Turning Machines, of which the following is a specification.

This invention relates to machines for cutting or turning spiral grooves, ropes, or beads on objects of wood or similar material, such as balusters and the like.

The object of the present invention is to produce a machine which shall be simple and cheap of construction, and which can be readily adapted to suit the requirements of various kinds of work, and which is easily adjustable for the sake of securing accuracy and correctness in the work performed.

For this purpose a machine embodying my invention consists essentially of two principal elements co-operating to produce the spiral incision upon the work, viz: first, a lathe provided with peculiar gearing to cause the work not only to rotate but also to slide longitudinally so as to produce a spiral motion, and, secondly, a revolving chamfer-head provided with knives for cutting or routing the work, the axis of the said chamfer-head being set at a suitable angle to the longitudinal axis of the lathe to produce a spiral incision of the required pitch.

The chamfer-head is preferably revolved by steam power, while the lathe is preferably turned independently thereof and by hand power for which purpose a suitable wheel is provided.

The sides of the chamfer head are beveled, the adjoining sides being beveled in opposite directions, and on these beveled sides the knives are adjustably mounted, so that some knives cut along the grain and others against the grain, and, so as to be accurately set to produce the exact incision or molding required. Means are also provided for returning the lathe to its starting position after a spiral has been completed, and also for holding the work against turning when the cutters are being adjusted.

In order to enable those skilled in the art to which my invention relates, to fully understand the same, I will now give a detailed description of the same, having reference to the accompanying drawings in which—

Figure 1 represents a side-elevation of a machine embodying my invention, partly in vertical longitudinal section; Fig. 2 a plan of the same; Fig. 3 a front elevation of the chamfer-head; Fig. 4 a top-plan of the same, partly in section; Figs. 5 and 6, detail views showing the form of the two principal knives or cutters, forming part of the chamfer-head; Fig. 7 a detail view in sectional-side-elevation of the unshipping device for the advancing gear, and Fig. 8, another detail view.

By referring to the drawings it will be noted that an apparatus involving my invention, consists essentially in a pair of lathe stocks A, suitably mounted upon a longitudinally movable frame, D, of any desired character, and a chamfer-head, B, preferably mounted beneath the mandrels of the lathe and having its shaft or axle, $b$, set at an angle to the axis, $a$, of the lathe, as clearly shown in Fig. 2.

Lathe stocks A are provided at the ends of the mandrels A' A', with two chucks, centering-pins or work-holders $a'$, $a'$, of any desired description for holding the work (in the present instance a baluster C) to be grooved or turned, the tail-stock mandrel being arranged to be moved longitudinally by the hand wheel, $a^2$, for inserting or removing the work in the same manner and by the same construction employed in the tail-stocks of ordinary lathes. Mechanism, to be hereinafter described, is also provided to advance the work longitudinally in the direction of the arrow 1, Figs. 1 and 2, proportionately to the angle to which the hand-wheel is turned, whereby a spiral line on the balusters is presented to the chamfer-head in a manner readily understood.

The chamfer-head in its preferable form, consists in a polygonal block, $b'$, adjustable on the shaft, $b$, by means of the adjustable collars, $b^2$, secured in their position of adjustment by set screws, $b^3$, the said shaft, $b$, being journaled in the box, E, and deriving its motion from any suitable source of power through a belt or otherwise; the shaft, $b$, being provided with a fast and loose pulley, $b^4$, $b^5$, in the usual manner for the purpose. Any other means for adjusting the cutter block, $b'$, may of course be employed. As shown the cutter block $b'$ is provided with beveled sides, $b^6$, the alternate sides being beveled or inclined in opposite directions, as plainly shown in Figs. 2 and 3, and for a purpose to be explained. To these beveled sides the knives or cutters $F'$, $F^2$, $F^3$, $F^4$ are arranged in a manner to be laterally and longitudinally adjustable, preferably by the following means. The knives consist of flat blades, as shown, having the cutting edges, $f$, and provided with the preferably open longitudinal slots, $f^4$. They are secured to the sides, $b^6$, of the block, $b'$, by screw-bolts $f^5$, passing through the slots into the block, the bolts $f^5$, being held by nuts, $f^6$, arranged in the mortises or squared recesses, $b^7$, in the blocks $b'$, which recesses hold the nuts against turning as shown. This chamfer-head, B, as already stated, revolves in the box, E, secured to the fixed frame of the machine and which is adapted to receive the cuttings or shavings produced in the cutting operation.

For causing the lathe, A, to be shifted longitudinally according to the extent of rotation imparted to the mandrel for producing the spiral incision, I preferably employ the following mechanism: The sliding frame D, of the lathe, is mounted in suitable guides in the fixed frame which supports the chamfer-head, B, and one side of the said frame, D, bears against the fixed fence, G, permanently secured to a standard, $g$, rising from the fixed frame of the machine. The fence, G, is provided with a rack, $g'$, which overhangs the lathe-frame and with which meshes a pinion, $d'$, keyed to a vertical shaft $d^2$, journaled in the bearing, $d$, attached to the lathe-frame, D. A beveled gear-wheel, $d^3$, is mounted on the shaft, $d^2$, near the bottom and meshes with another beveled gear, $d^4$, secured to the mandrel, $A'$ of the lathe.

In order to release the lathe and return it to its starting point when it has reached the end of its motion and the spiral has been completed, I make the pinion or cog, $d'$, adapted to be disengaged from the rack, $g'$, preferably by adapting the shaft, $d^2$, to which it is attached, to slide longitudinally in the bearing, $d$, as best shown in Fig. 7. Of course, it will be understood, that for this purpose the bevel-gear, $d^3$, is loosely keyed to this shaft, so that the same may move longitudinally through this bevel-gear, but at the same time rotates with the same. For the purpose of depressing the shaft, $d^2$, to disengage the pinion, $d'$, from the rack, as indicated in dotted lines in Fig. 7, I preferably fulcrum a lever, H, at $h$, on a bracket, $H'$, rising from the frame, D, of the lathe, the forward arm of said lever bearing on the end of shaft, $d^2$, and having a catch, $h'$, pivotally suspended therefrom and adapted, when lever H is depressed, to engage a lip, $h^2$, on the forward arm, $h^3$, of the bracket $H'$, which extends over the pinion, $d'$, and serves as the upper bearing for the shaft, $d^2$, as shown best in Figs. 1 and 7. A spring, $d^5$, encircling the shaft, $d^2$, and located between gear, $d^3$, and pinion, $d'$, tends to keep the shaft, $d^2$, and pinion, $d'$, elevated and in engagement with rack, $g'$, while an annular shoulder, $d^6$, which bears under the rack, $g'$, limits the upward movement of the said pinion. In order to hold the pinion closely against the rack, I provide a retaining hook, $h^4$, whose shank, $h^5$, passes through a socket, in the bracket arm, $h^3$, and is retained by a set-screw, $h^6$, and whose lip, $h^7$, overlaps a rear shoulder, $g^2$, on and running parallel with the rack, $g'$, (see Figs. 2 and 8) and thus holds the rack and pinion firmly together, while permitting the latter to travel over the former.

The knives $F'$, $F^2$, &c., of the chamfer-head are here shown to be four in number, which number is sufficient in most cases. Usually I employ only the knives, $F'$, $F^2$, and the other knives serve simply to properly balance the chamfer-head and are set back sufficiently so as not to strike the work. The knives, $F'$, $F^2$, it will be observed, are mounted on adjoining sides of the block, $b'$, and hence, as already explained, are laterally inclined in opposite directions. Where a spiral "rope" is to be formed on the baluster, C, the cutting edges, $f$, of these knives each consists of a beak or point, $f^2$, for cutting out the deepest part $c$ of the "rope" and a curved edge, $f^3$, corresponding in transverse section to the form of the rope to be cut, the curved edges of the two knives being on opposite sides as shown, so that while the one knife cuts along the grain of the baluster the other cuts against the grain. Where very large ropes or moldings are to be cut the knives, $F^3$ and $F^4$, come into play and they serve to cut away the portions of the baluster farthest removed from the deepest part or channel $c$ of the rope, the one knife cutting on one side and the other on the other side of said channel, as will be readily understood by reference to the drawings. Where the spiral to be turned is so long that the knives cannot be arranged to cut against the grain of the wood, one knife only is used and after the work has been run through once it is then turned end for end and run through a second time, thus routing or cutting the wood on the other side of the rope or bead and completing the same.

In order to readily adjust the knives to the particular rope or bead to be cut on the baluster or the like, and to obviate the necessity of unnecessary grinding and sharpening of the knives, I place a pattern, I, corresponding in design to the cross-section of the bead, or rope to be cut over the grinding box, E, directly under the point of the baluster where the knives will strike the same, and, I then so adjust the knives on the chamfer-head by the means heretofore described, that they will accurately fit into and coincide with the said molding at the points where they are to cut away the baluster. This pattern, I, is best shown in Fig. 2, and is made removable so as to be replaced by any other pattern, when a change of design is desired.

The pinion $d'$, is made removable and may be replaced by pinions of varying sizes, according to the pitch desired for the spiraling operation, as will be readily understood. In order that the various sizes of the pinion, may always accurately engage the fixed rack, $g'$, I make the main portion of the frame, D, which carries the working parts of the lathe, laterally movable with respect to the part, $D'$, which rests against the fence G. I accomplish this preferably as shown in the drawings (see Figs. 1, 2, and 7), that is to say by arranging two lateral and parallel arms, $D^2$, $D^2$, on part $D'$, the said arms passing through sockets, $D^3$, $D^3$, in the main portion of frame, D, the sockets $D^3$, being provided with set-screws, $D^4$, $D^4$, for securing the parts in any position of adjustment.

The operation of my machine is sufficiently clear from the foregoing.

The baluster, C, to be spiraled is secured in position between the two chucks or centering-pins, $a'$, of the lathe, A, in the ordinary manner, the power is applied to the chamfer-head B by shifting the belt to the fast pulley, and the baluster or other object to be spiraled is turned as the routing or cutting proceeds. As the mandrels, $A'$, of the lathes are turned, the pinion, $d'$, through the medium of bevel cogs, $d^4$, $d^3$, and shaft $d^2$ is caused to travel over the rack, $g'$, and thus shift the lathe, and with it the work longitudinally in the direction of the arrow, 1, thus producing the spiral motion. When the lathe has traveled sufficiently to cut the entire length of the rope or bead the lever, H, is raised, whereby the pinion, $d'$, is depressed out of engagement with the rack, and is held in its downward position by reason of the latch, $h'$, which now locks the lever in its raised position. The lathe may then be returned to its initial position.

Prior to starting the work the baluster is held in place by a retaining block, Q, attached to a rod, $q$, adjustable by set screw $q'$, in an arm $Q'$, pivoted in a standard, $q^2$, rising from the lathe-frame, D. This retaining block, Q, holds the baluster against turning when striking the knives of the chamfer-head, while the operator is placing them into proper position for cutting the baluster. When the knives have assumed their proper position for the cutting operation, the block Q is swung out of the way as indicated in dotted lines in Fig. 1.

When it is necessary to repeat the work, that is, to produce smoother work or to enlarge the bead, the above operation is repeated, the lathe having first been returned to the starting point.

When it is desired to cut two parallel spirals in the baluster, the baluster is revolved on the mandrels, $A'$, one half revolution (one hundred and eighty degrees), the pinion, $d'$, being in the meanwhile disengaged from the rack, $g'$, by the means aforesaid. The block, Q, is again placed upon the squared portion of the baluster and thus held while the knives are being adjusted. Where it is necessary to make four "turns" the baluster is to be revolved a quarter revolution after each turn and then held against turning by the block, Q, while the knives are set. Where the balusters are provided at two opposite sides of their squared portions with the bevels, U and V, Fig. 2, the block Q is fitted at its bottom with the swiveled supplemental block, $Q^2$, having a recess which, in the position indicated in Fig. 1, fits over the bevel, V, when it is uppermost and when the block is let down to hold the baluster against turning when setting the knives, while when the bevel U is uppermost, it will have to be turned one hundred and eighty degrees on its swivel, as indicated in dotted lines, Fig. 1.

When it is desired to spiral tapered balusters and the like, all that is necessary will be to properly tilt the lathe frame and the fence with respect to a horizontal plane, so that the side of the body to be spiraled will be substantially parallel to the horizontal plane in which the shaft of the chamfer-head revolves. This may be accomplished by suitably raising the lathe-frame by wedges applied at one end thereof or otherwise.

It is manifest that while I consider the machine described in illustration of my invention the preferred embodiment thereof, the same may be modified in many particulars without departing from the spirit of my invention. I do not, therefore, desire to be limited to the exact details described, but

What I claim, and desire to secure by Letters Patent, is—

1. In a spiral turning machine, the combination, with a pair of lathe stocks, means for moving the stocks longitudinally, and a chamfer-head, of an arm pivoted to swing in a vertical plane coincident with the axial line joining the stocks, and a retaining block carried by the arm, substantially as set forth.

2. In a spiral-turning machine, a fixed rack, as $g'$, in combination with a lathe, a beveled gear mounted on the mandrel of the lathe, a second bevel-gear meshing with the same, and a shaft splined to the second bevel gear and adapted to slide in the same, and a pinion secured to the said shaft and adapted to mesh with the fixed rack, substantially as set forth.

3. In a spiral-turning machine, a fixed rack, as $g'$, in combination with a longitudinally movable lathe, a pinion suitably geared with the mandrel of the lathe and mounted on a shaft loosely journaled in the lathe-frame, a spring, as $d^5$, for raising the shaft and pinion and keeping it in engagement with the rack, and a lever fulcrumed in a bracket on the lathe-frame, one arm of which is adapted to bear on the end of the shaft, substantially as set forth.

4. In a spiral-turning machine, a fixed rack, as $g'$, in combination with a pinion geared with the mandrel of the lathe and mounted on a shaft adapted to slide in its bearings, a spring, as $d^5$, for keeping the pinion in engagement with the rack, a lever for depressing the sliding shaft, and a catch for holding and retaining the lever after it has depressed the sliding shaft, substantially as set forth.

5. In a spiral-turning machine, a fixed rack, as $g'$, in combination with a longitudinally movable lathe, a pinion journaled in the lathe frame and meshing with the rack, and a retaining hook, as $h^4$, extending from a bracket on the lathe frame and having a lip, as $h^7$ adapted to overlap a shoulder on the rack, $g'$, and thereby to hold the pinion and rack in close engagement, substantially as set forth.

6. In a spiral-turning machine, a cutter-head and a lathe in combination with a retaining block, as Q, pivotally mounted in the lathe frame and provided with a swiveled supplemental block having a lower recess, substantially as set forth.

In testimony whereof I have hereunto set my hand in presence of two subscribing witnesses.

FRANK OSCAR HOLMSTROM.

Witnesses:
LOUIS FEESER, Jr.,
L. J. WITHEE.